(12) United States Patent
Duvall

(10) Patent No.: US 9,897,244 B1
(45) Date of Patent: Feb. 20, 2018

(54) GROUT REINFORCED PIGGABLE PIPELINE CONNECTOR

(71) Applicant: Darel W. Duvall, Tulsa, OK (US)

(72) Inventor: Darel W. Duvall, Tulsa, OK (US)

(*) Notice: Subject to any disclaimer, the term of this patent is extended or adjusted under 35 U.S.C. 154(b) by 451 days.

(21) Appl. No.: 14/696,668

(22) Filed: Apr. 27, 2015

(51) Int. Cl.
*F16L 57/00* (2006.01)
*F16L 55/48* (2006.01)
*F16L 58/18* (2006.01)
*F16L 41/02* (2006.01)

(52) U.S. Cl.
CPC ............ *F16L 57/00* (2013.01); *F16L 41/023* (2013.01); *F16L 55/48* (2013.01); *F16L 58/188* (2013.01)

(58) Field of Classification Search
CPC ....... F16L 57/00; F16L 41/023; F16L 58/188; F16L 58/06; F16L 9/18; F16L 9/19; F16L 11/22; F16L 58/08; F16L 58/14; F16L 57/06; F16L 55/48; F16L 55/175; E21B 7/061; E21B 17/043; E21B 23/002; E21B 43/305
USPC .............. 285/123.3, 131.1, 132.64, 230, 47; 52/505, 607; 138/115–117, 177, 175
See application file for complete search history.

(56) References Cited

U.S. PATENT DOCUMENTS

| 3,767,232 | A | * | 10/1973 | Smith | F16L 9/18 285/150.1 |
| 3,934,615 | A | * | 1/1976 | Lukomskyj | F16L 3/04 138/111 |
| 4,457,364 | A | * | 7/1984 | DiNicolantonio | C10G 9/002 165/134.1 |
| 4,475,747 | A | * | 10/1984 | Ashby | B42D 15/006 462/6 |
| 8,667,995 | B1 | * | 3/2014 | Fanelli | F24F 13/0245 138/112 |
| 2015/0306624 | A1 | * | 10/2015 | Allison | F16L 58/06 427/383.1 |

* cited by examiner

*Primary Examiner* — David Bochna
*Assistant Examiner* — James A Linford
(74) *Attorney, Agent, or Firm* — Head, Johnson, Kachigian & Wilkinson, PC

(57) ABSTRACT

A pipeline connector that is piggable and is reinforced against deformation. At the point where the connector diverges from one pipeline to multiple pipelines, the connector may be surrounded by a tube, forming a space between the connector and the tube. The space may be filled with filler material, such as grout. Thus, radial pressure from the contents of the pipeline may be borne by the tube rather than the connector at the point of divergence. The ends of the tube surrounding the connector may be covered by plates, which may enclose the grout-filled space and which may act as feet for the pipeline connector.

9 Claims, 5 Drawing Sheets

GROUT REINFORCED PIGGABLE PIPELINE CONNECTOR

CROSS REFERENCE

Not Applicable.

BACKGROUND OF THE INVENTION

Field of the Invention

This invention relates generally to a pipeline connector, and more particularly, but not by way of limitation, to a pipeline connector that is piggable and is reinforced with a grout-like substance contained in an outer shell.

Description of the Related Art

Devices known as pigs are often used to perform maintenance and for other purposes within pipelines while the pipelines are in use. Pigs have a difficult time negotiating a sharp bend in a pipeline, such as those that can occur at the junction of more than one pipeline. Thus, to be piggable, pipelines sometimes employ Y-shaped junctions rather than T-shaped junctions, making the change in direction a gradual curve rather than a sharp corner.

The problem with such a piggable junction is that it tends to deform due to the pressure of the pipeline's contents. The cross section of the pipeline at the point of transition from one pipeline to two is shaped like two overlapping circles, or like an oval with both long sides pinched inward at their centers. The contents of the pipeline exert outward force radially, putting undue pressure on the two inwardly projecting points.

One way to prevent the pipeline from deforming in this transition area is by adding a series of ribs around the outside of the pipeline, often with spacer elements at the points. This provides additional support for the pipeline to maintain its shape and resist deformation in the transition area. The problem with this approach is that each rib must be welded in place along the unusual contours of the pipeline, which may be difficult, time consuming, and ultimately costly.

Based on the foregoing, it is desirable to provide a pipeline connector that both is piggable and maintains its proper shape during use.

It is further desirable for such a pipeline connector to be reinforced in a way that allows the pipeline to resist deformation while requiring minimal welding.

SUMMARY OF THE INVENTION

In general, in a first aspect, the invention relates to a reinforced pipeline connector comprising: a pipeline connector; a tube surrounding at least a portion of the pipeline connector, forming a space between the tube and the pipeline connector; and a filler material filling the space between the tube and the pipeline connector.

The tube may have two ends and the pipeline connector may extend out of each of the two ends of the tube. The reinforced pipeline connector may further comprise a plurality of plates covering the ends of the tube except where the pipeline connector extends through each of the plates. The plates may be welded into place against the ends of the tube. The plates may have a larger height than the tube, such that the plates extend beyond the tube. The plates may form feet upon which the reinforced pipeline connector may rest. The filler material may comprise grout or other such liquid to solid material. The tube may be cylindrical. The pipeline connector may be piggable, and may be a Y-connector.

The pipeline connector may have an end that is attachable to a single pipeline and an opposing end with a plurality of legs that are attachable to a plurality of pipelines. The tube may have an end that surrounds the end of the pipeline connector that is attachable to the single pipeline, where the end forms a plane that is near perpendicular to the pipeline connector where the plane intersects the pipeline connector. The tube may further have an opposing end that surrounds the plurality of legs, where the end forms a plurality of planes that are each near perpendicular to one of the legs where the plane intersects the leg. The reinforced pipeline connector may further comprise a plurality of plates lying in each of the planes and enclosing the space between the tube and the pipeline connector.

The pipeline connector may have an end that is attachable to a single pipeline and an opposing end with a plurality of legs that are attachable to a plurality of pipelines, with a point where the legs diverge. The tube may surround the pipeline connector at the point where the legs diverge.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 5:
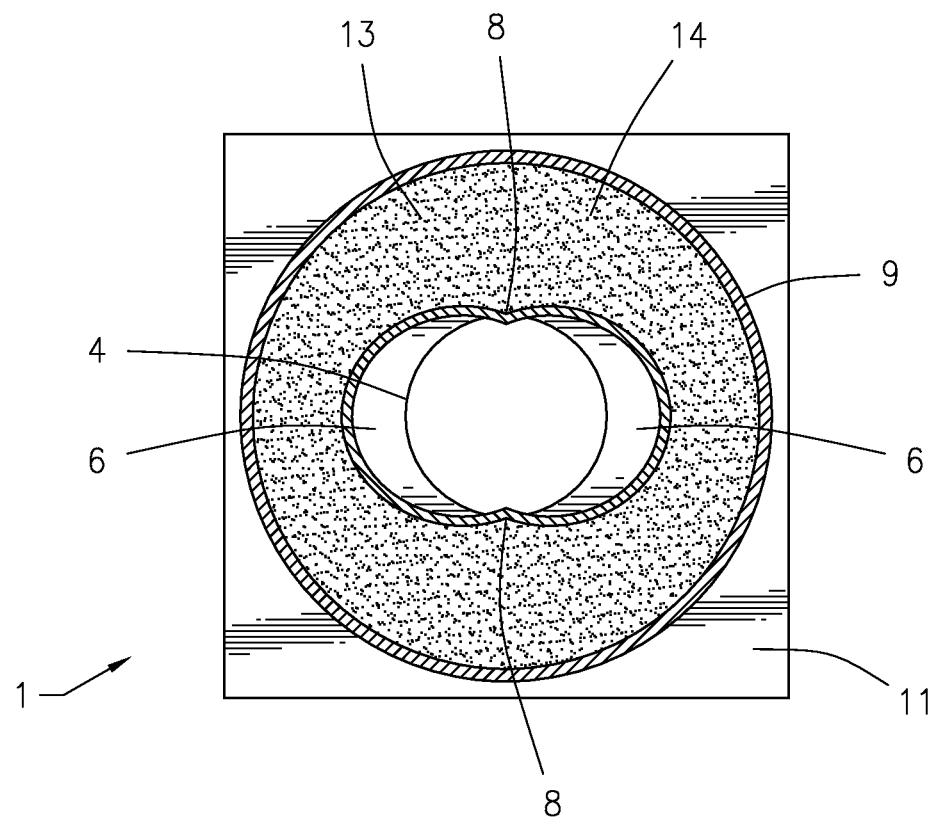
FIG. 5 is a vertical cross sectional view of the pipeline connector.
Figure 6:
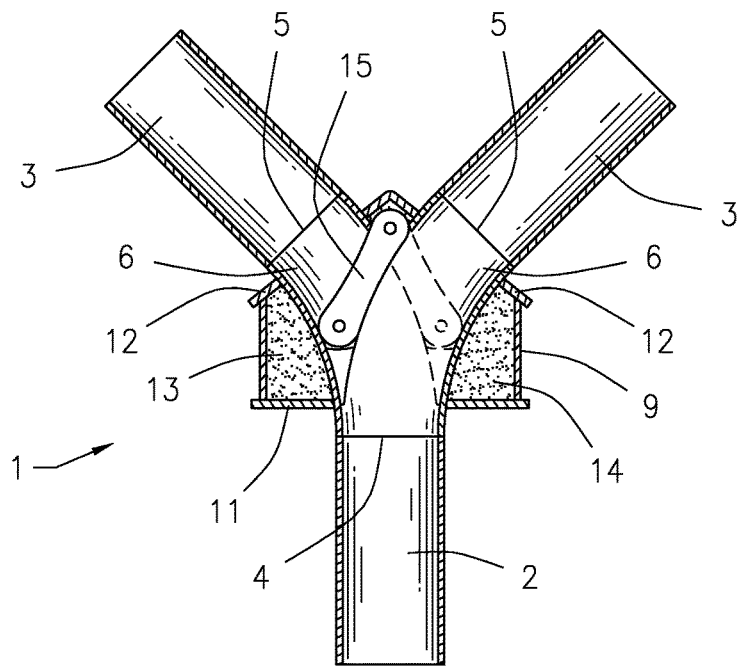
FIG. 6 is a horizontal cross sectional view of an alternate configuration of the pipeline connector, showing an internal switch.
Figure 7:
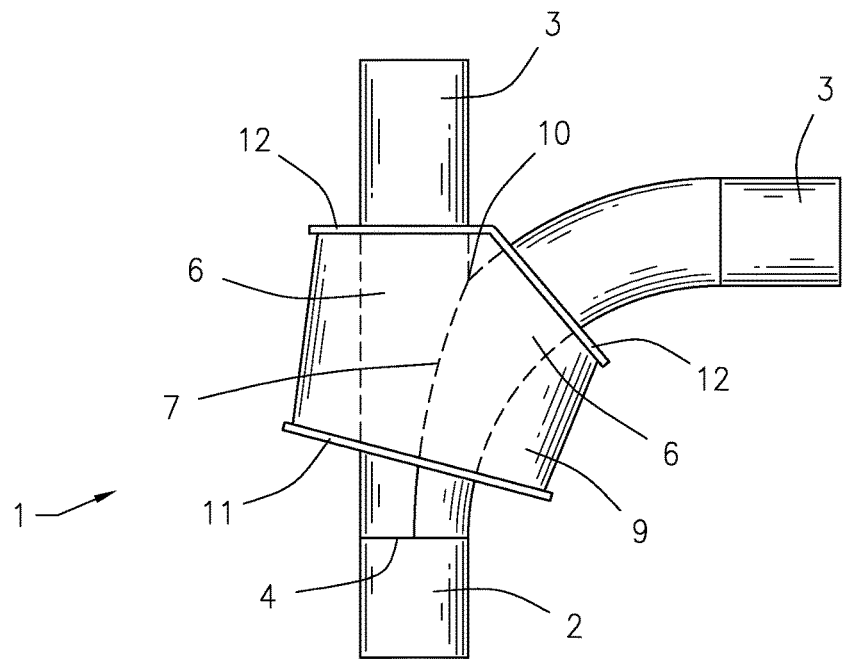
FIG. 7 is a top view of an alternative configuration of the pipeline connector.
Figure 8:
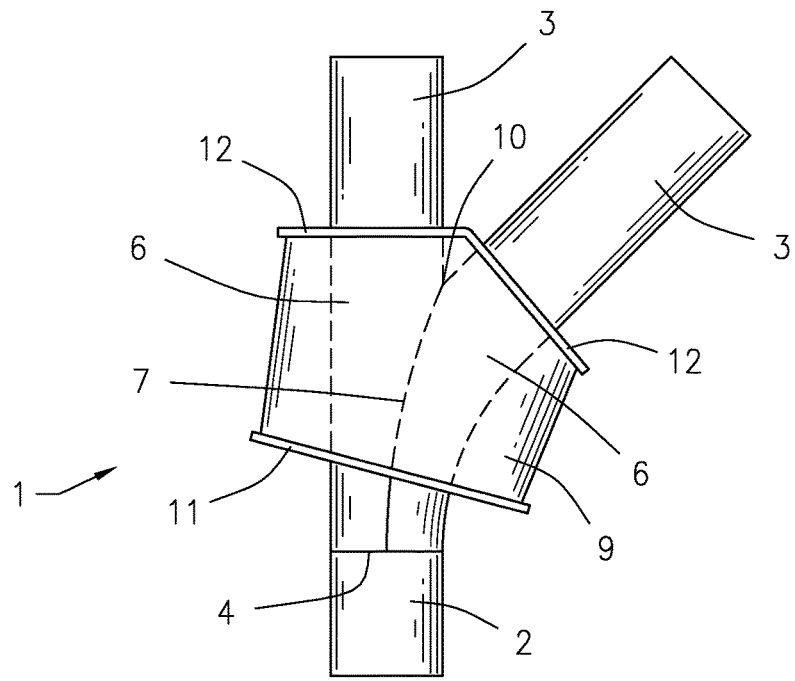
FIG. 8 is a top view of an alternative configuration of the pipeline connector.
Figure 9:
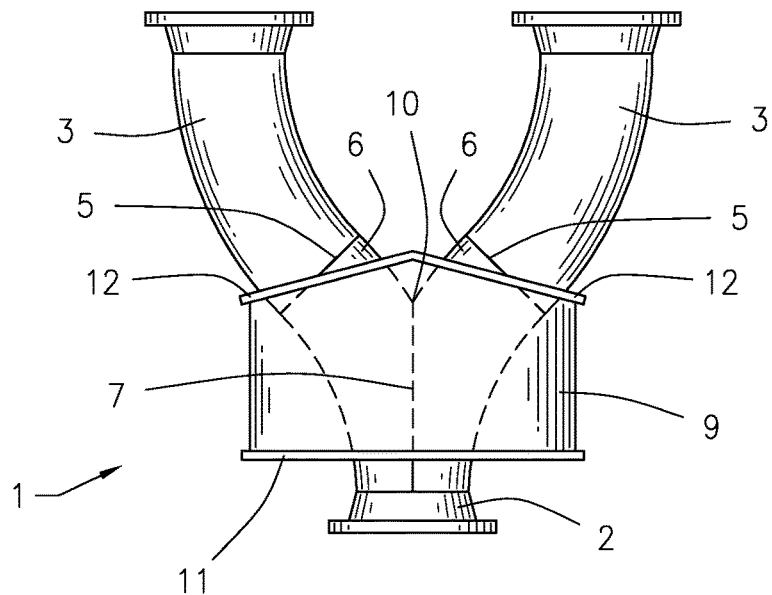
FIG. 9 is a top view of an alternative configuration of the pipeline connector.

In general, in a first aspect, the invention relates to a reinforced piggable pipeline connector 1. The connector 1 may connect a single pipeline 2 to a plurality of pipelines 3. The connector 1 may be a Y-shaped connector, as shown in FIGS. 1 through 6, or any other shape connector desired. For example, two pipelines 3 may travel perpendicularly in opposite directions relative to the pipeline 2, as shown in FIGS. 1 through 4; one pipeline 3 may travel perpendicularly while another pipeline 3 continues in the same direction as pipeline 2, as shown in FIG. 7; one or more pipelines 3 may travel at any desired angle relative to pipeline 2, as shown in FIGS. 6 and 9; two or more pipelines 3 may each travel at different angles relative to pipeline 2, as shown in FIG. 8; or any other desired configuration or combination of configurations. The inventive concept is the same, and the same elements and limitations may apply. In general, the contents may flow from the plurality of pipelines 3 to the single pipeline 2. The direction of flow may be reversed if a switch 15 is present, as shown in FIG. 6.

The connector 1 may have a circular cross section at the point 4 where it joins pipeline 2. The connector 1 may likewise have a circular cross section at each point 5 where it joins each of the pipelines 3. Alternately, the connector may have any desired cross sectional shape at point 4, points 5, or points 4 and 5 to match the cross sectional shape of the pipeline 2, pipeline 3, or pipelines 2 and 3, respectively. Between points 4 and 5, a plurality of legs 6, with each leg 6 terminating at a point 5, may come together to essentially form a single pipeline at point 4. Thus, the connector 1 may transition from the plurality of pipelines 3 to the single pipeline 2, allowing the contents of pipelines 3 to travel through the connector 1 along each of the legs 6 to reach the pipeline 2. The legs 6 may each curve gradually to the desired angle, allowing a pig to travel through the connector 1. The connector 1 may be fully piggable. The connector 1 may not have any 90° angles or any other sharp angles that would make passing a pig therethrough difficult or impossible.

Figure 4:
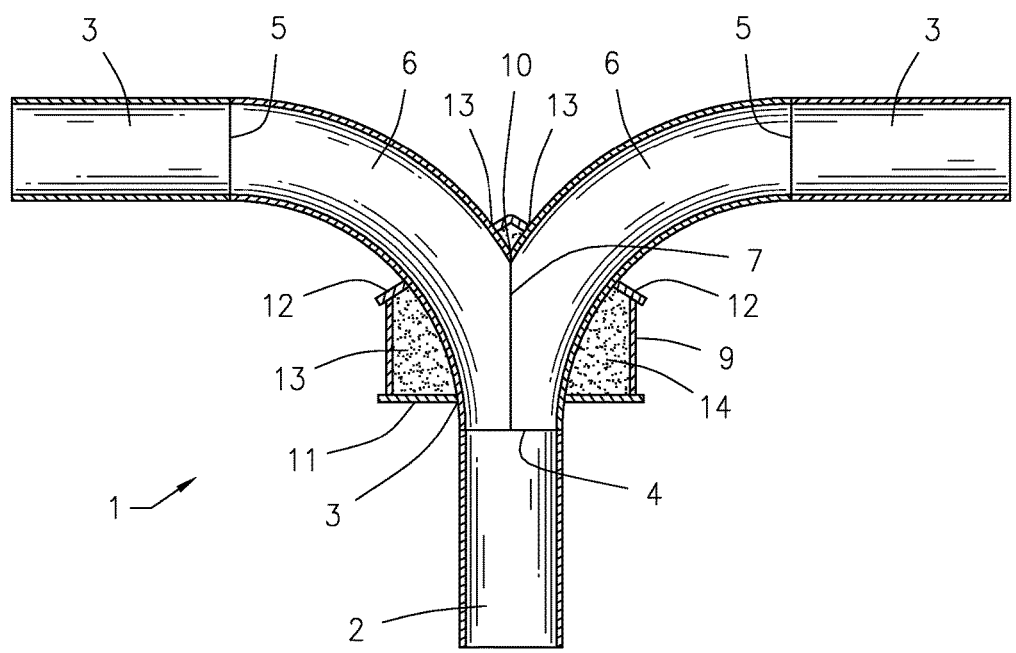
FIG. 4 is a horizontal cross sectional view of the pipeline connector.

Traveling backwards from pipeline 2 to pipelines 3, as the connector 1 splits in two or more directions, the legs 6 may join together along their common sides, as shown in FIG. 4. Over this range of connection 7, each leg 6 may begin at point 4 with a cross section of no more than half a circle, with the cross section of each individual leg 6 increasing along the range of connection 7 until the cross section is a full circle, at which point the legs 6 may no longer be connected together along their sides and may continue with cross sections of full circles until terminating at points 5. When the connector 1 joins pipeline 2 to two pipelines 3, as shown, each leg 6 may have a cross section of a half circle at point 4 and may be joined together such that the cross section of the connector 1 as a whole at point 4 is a circle, as noted above. Traveling along the range of connection 7, the two legs 6 may each have cross sections increasing toward full circles until both legs 6 have cross sections of full circles beyond the range of connection 7. Thus, as any given point along the range of connection 7, the cross section of the connector 1 may be shaped similar to two overlapping circles joined at their two points of connection, but without the overlapping portion, as seen in FIG. 5. In other words, the cross section may be shaped similar to an oval with the two long sides pinched inward. Thus, points 8 may be formed along the range of connection 7 where the two legs 6 connect. Points 8 may point inward, and may tend to deflect outward if not reinforced due to the radial pressure from the contents of the pipeline. Please note that points 8 are actually lines rather than points, as they travel the length of the range of connection 7, but appear as points in a cross sectional view and thus are referred to as points herein for purposes of explanation.

Figure 1:
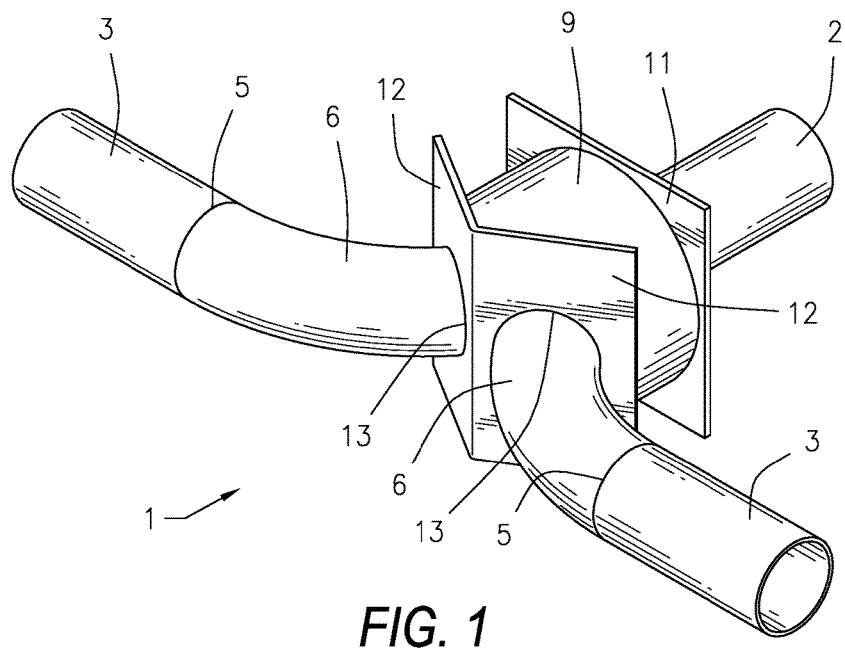
FIG. 1 is a perspective view of the pipeline connector.
Figure 2:
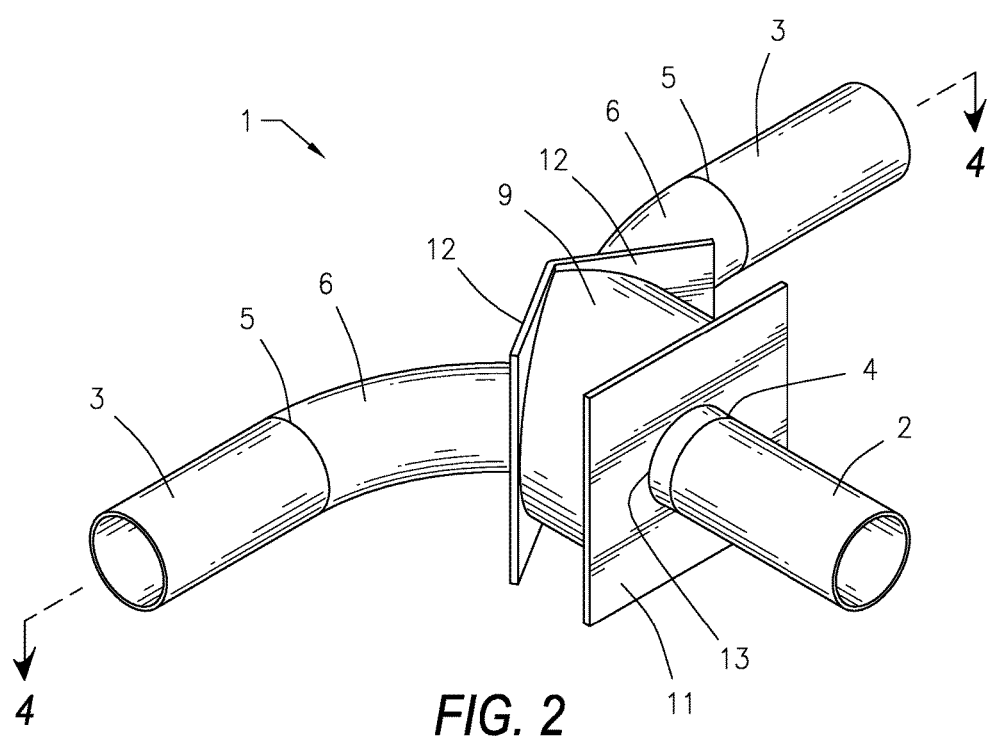
FIG. 2 is a different perspective view of the pipeline connector.
Figure 3:
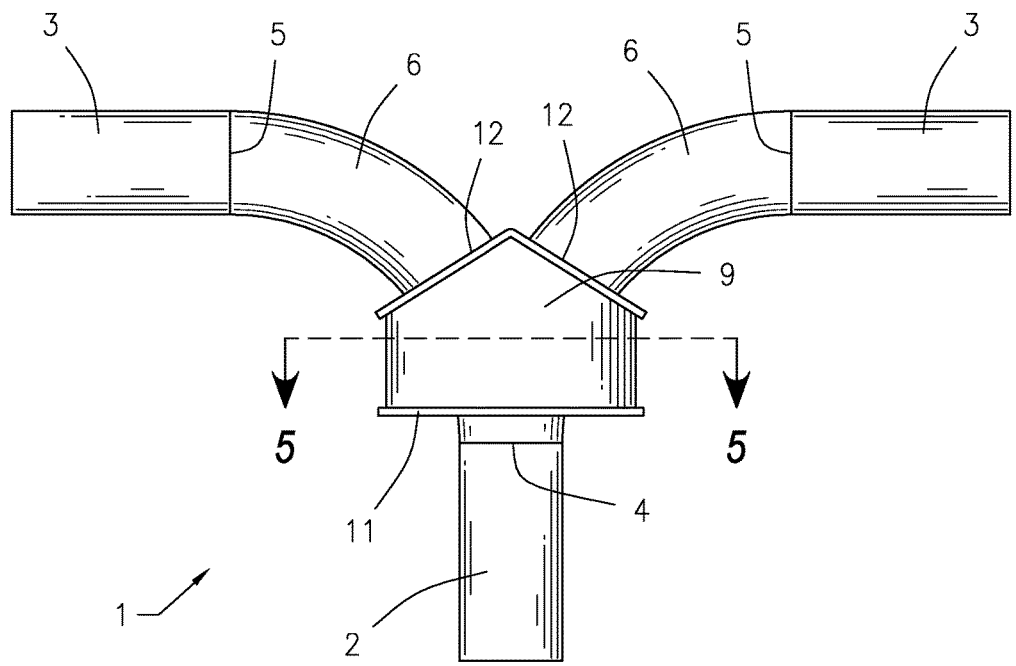
FIG. 3 is a top view of the pipeline connector.

To prevent the deformation of the points 8, a tube 9 may surround the legs 6 across at least a portion of the range of connection 7. In particular, the tube 9 may surround the legs 6 from the point at which the cross section of the legs 6 joined together first deviates from a circle to the point at which the cross sections of each of the legs 6 independently form circles. The tube 9 may be cylindrical or may have any other desired shape, so long as it fully surrounds the legs 6 over at least a portion of the range of connection 7. The tube 9 may be made of the same material as the pipeline 2, the pipelines 3, and/or the legs 6, or may be any other desired material. The tube 9 may extend further along the middle of the connector 1 than along the sides, as best seen in FIGS. 2 and 3, to fully cover the point 10 at which the legs 6 branch out and disconnect from each other. Thus, the end of the tube 9 near point 4 may have a circular cross section aligned concentrically with the connector 1 at that point and forming a plane perpendicular or substantially perpendicular to the walls of the connector 1 at that point, while the opposing end of the tube 9 may have a plurality of planes, each plane perpendicular or substantially perpendicular to the walls of one of the legs 6 at that point. Alternately, the planes may be any angle other than perpendicular to the walls, as shown in FIG. 9. A plate 11 may cover the end of the tube 9 near point 4 and plates 12 may cover each of the planes of the opposing end, as shown in FIGS. 1 through 4. Each plate 11 and 12 may have an opening 13 through which the legs 6 may extend. Each plate 11 and 12 may be welded to the legs 6 at one location, at a plurality of locations, or along the entire perimeter of the opening 13; may be connected to the legs 6 other than by welding; or may not be connected to the legs 6. Each plate 11 and 12 may extend at least to the tube 9, thus completely covering the opening in the ends of the tube 9 from the tube 9 to the exterior of the legs 6. Optionally, any or each plate 11 and 12 may extend beyond the perimeter of tube 9, as shown. Each plate 11 and 12 may be welded to the tube 9 at one location, at a plurality of locations, or along the entire perimeters of each end of the tube 9; may be connected to the tube 9 other than by welding; or may not be connected to the tube 9. The plates 12 may abut each other, as shown in FIGS. 1 and 3. The plates 12 may be welded to each other at one location, at a plurality of locations, or along their entire shared sides; may be connected other than by welding; or may not be connected to each other. The plates 11 and 12 may be any desired shape. For example, any or each of the plates 11 and 12 may be square, rectangular, or another shape with at least one flat side, as shown, to act as a foot for the connector 1.

The tube 9, legs 6, and plates 11 and 12 may define a space 13. This space 13 may be filled with a filler material 14, such as grout or any other desired material. For example, filler material 14 may be any liquid to solid material. The filler material 14 may reinforce the shape of the legs 6 and transfer the radial pressure from the contents of the pipeline to the tube 9. Thus, the tube 9 may bear the pressure rather than the legs 6, which may prevent the legs 6, and particularly the points 8, from deforming.

Additionally or alternately, the tube 9, plates 11 and 12, and filler material 14 may be used to reinforce and/or maintain the shape of any pipeline or plurality of pipelines, regardless of whether they are shaped as described herein or indeed whether they actually join one pipeline to a plurality of pipelines.

Whereas, the devices and methods have been described in relation to the drawings and claims, it should be understood that other and further modifications, apart from those shown or suggested herein, may be made within the spirit and scope of this invention.

What is claimed is:
1. A reinforced pipeline connector comprising:
a Y-shaped pipeline connector;

a tube surrounding at least a portion of the Y-shaped pipeline connector, forming a space between the tube and the Y-shaped pipeline connector; and a filler material filling the space between the tube and the Y-shaped pipeline connector, where the filler material comprises a liquid to solid material;

where:

the Y-shaped pipeline connector has an end that is attachable to a single pipeline and an opposing end with a plurality of legs that are attachable to a plurality of pipelines;

the tube has an end that surrounds the end of the pipeline connector that is attachable to the single pipeline, where the end forms a plane that is perpendicular to the Y-shaped pipeline connector where the plane intersects the Y-shaped pipeline connector, a flat plate member lying in the plane and being attached to the tube and the Y-shaped connector; and the tube has an opposing end that surrounds the plurality of legs, where the end forms a plurality of planes that are each perpendicular to one of the legs where the plane intersects the leg, there being a flat plate member lying in each plane of the plurality of planes wherein each flat plate member is attached to a single leg of the plurality of legs, to the tube, and to other flat plate members positioned in the plurality of planes, the additional flat plate members being angled relative to each other and to a longitudinal axis of the tube.

2. The reinforced pipeline connector of claim 1 where the Y-shaped pipeline connector is piggable.

3. The reinforced pipeline connector of claim 1 where the tube has two ends and where the Y-shaped pipeline connector extends out of each of the two ends of the tube, the reinforced pipeline connector's plates cove the ends of the tubes except where the Y-shaped pipeline connector extends through each of the plates.

4. The reinforced pipeline connector of claim 3 where the plates are welded into place against the ends of the tube.

5. The reinforced pipeline connector of claim 3 where the plates have a larger height than the tube, such that the plates extend beyond the tube.

6. The reinforced pipeline connector of claim 5 where the plates form feet upon which the reinforced pipeline connector may rest.

7. The reinforced pipeline connector of claim 1 where the filler material comprises grout.

8. The reinforced pipeline connector of claim 1 where the tube is cylindrical.

9. The reinforced pipeline connector of claim 1 where:

the Y-shaped pipeline connector has an end that is attachable to a single pipeline and an opposing end with a plurality of legs that are attachable to a plurality of pipelines;

the Y-shaped pipeline connector has a point where the legs diverge; and the tube surrounds the pipeline connector at the point where the legs diverge.

* * * * *